United States Patent [19]

Vachon

[11] Patent Number: 4,924,596

[45] Date of Patent: May 15, 1990

[54] METHOD FOR CORRECTING SLIPPAGE DURING WIRELINE DEPTH MEASUREMENTS

[75] Inventor: Guy Vachon, Austin, Tex.

[73] Assignee: Schlumberger Technology Corporation, Houston, Tex.

[21] Appl. No.: 344,207

[22] Filed: Apr. 27, 1989

[51] Int. Cl.[5] .............................................. G01B 3/12
[52] U.S. Cl. ...................................... 33/715; 33/735; 33/773
[58] Field of Search ................. 33/715, 735, 736, 744, 33/747, 772, 773; 377/17, 18, 39; 364/562

[56] References Cited

U.S. PATENT DOCUMENTS

| | | | |
|---|---|---|---|
| 4,052,599 | 10/1977 | Whiteley et al. | 364/562 |
| 4,117,600 | 10/1978 | Guignard et al. | 33/735 |
| 4,179,817 | 12/1979 | Lavigne et al. | 33/735 |
| 4,447,955 | 5/1984 | Stutz et al. | 364/562 |
| 4,718,168 | 1/1988 | Kerr | 33/735 |

Primary Examiner—William A. Cuchlinski, Jr.
Assistant Examiner—Patrick R. Scanlon
Attorney, Agent, or Firm—Cox & Smith Incorporated

[57] ABSTRACT

A method for measuring wireline depths in a borehole using paired encoder wheels frictionally engaging the wireline is disclosed. The method allows for the correction of the measurement from a slipping encoder wheel without corrupting the measurement from the non-slipping encoder wheel.

The method comprises incrementing corresponding depth counters whenever a pulse is produced by one of the encoder wheels. The depth counts are compared and if a significant difference exists, the value of the counter corresponding to the slipping encoder wheel is set equal to the value or the other wheel.

3 Claims, 1 Drawing Sheet

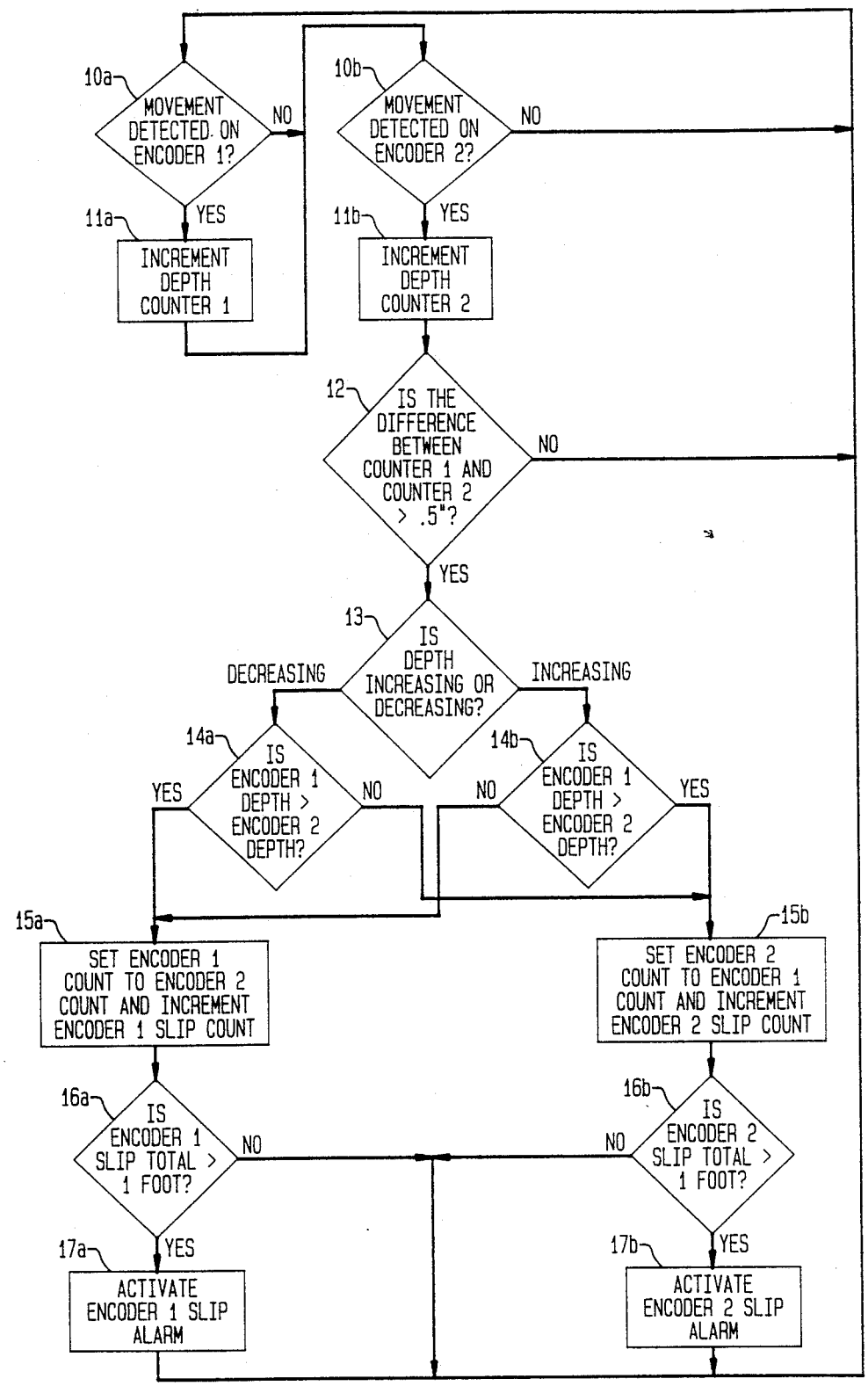

ND FOR CORRECTING SLIPPAGE
METHOD FOR CORRECTING SLIPPAGE
DURING WIRELINE DEPTH MEASUREMENTS

BACKGROUND

The present invention relates to a method and apparatus for providing wireline depth measurements for a bore-hole tool lowered in the bore hole on a wireline such as during well-logging operations.

One method in common use for providing a wireline depth measurement involves the use of encoder wheels which frictionally engage the cable or wireline to detect its movement. One such system is described in U.S. Pat. No. 4,179,817, the disclosure of which is hereby incorporated by reference into the present specification. In this type of system, two encoder wheels are used for redundancy. As the cable moves, the wheels turn and, by counting the revolutions of the wheel, the amount of cable going into the hole can be measured. As the wheels turn, pulses are produced which are then counted by appropriate electronic circuitry. Since the wheels are not perfectly round and may be of different sizes, a wheel correction may also be applied to the measurement. This correction eliminates systematic errors due to physical differences in the wheels. For example, if one wheel is larger than the other so that it produces one less pulse every 10,000 pulses than the smaller wheel, a wheel correction is applied by counting every 10,000th pulse from the larger wheel twice.

Other sources of error during this type of depth measurement are not systematic, however. That is, they occur randomly. A major source of such random error is slippage of the encoder wheel. If the surface of the cable is slipping on the surface of the encoder wheel, some of the motion of the cable will go undetected. Prior methods have attempted to correct for this by simply averaging the depths measured by each wheel. The rational for this is that errors in the measurements from each wheel will cancel out. However, slippage errors are almost invariably unidirectional and both measuring wheels rarely slip simultaneously. This means that if only one of the two encoder wheels is slipping, averaging the two together is not the optimum thing to do. In fact, with averaging, the depth from the correct wheel is corrupted by the depth from the wheel that has slipped. The result is a measurement that is not as bad as the depth measured by the wheel which has slipped but not as good as the depth from the wheel which has not slipped.

For example, in the system described in U.S. Pat. No. 4,179,817, independent signals corresponding to the rotation of each encoder wheel are compared to determine which signal corresponds to the more rapidly rotating wheel. Where the comparison finds the signals differ only by a small percentage, the signals are automatically averaged to provide the depth indication. Where the difference between the signals is more than a small percentage, the signal from the apparently less rapidly rotating wheel is disregarded. The system provides for indicating the apparently slipping wheel to alert the operator so that appropriate action may be taken. Thus, in that system, the measurement for: the non-slipping wheel is corrupted by averaging it with the measurement from the slipping wheel except in those cases where the wheel slips so much that it is disregarded thereafter.

It is, therefore, an object of the present invention to provide a method for measuring wireline depths which corrects for encoder wheel slippage in a manner which does not corrupt the measurement from a non-slipping encoder wheel.

SUMMARY OF THE INVENTION

The present invention capitalizes on the fact that slippage errors are unidirectional. That is, the errors due to slippage lessen the depth measurement. The present invention also makes use of the fact that the encoder wheels rarely slip simultaneously. In accordance with the present invention, if depth pulses coming from one wheel are accumulated faster than those from the other, the slower wheel is assumed to have slipped and its accumulated depth is corrected. This is done by accumulating the pulses (after wheel correction) from each wheel separately and comparing the two. If one encoder wheel gets too far ahead of the other, the one that is behind is assumed to have slipped so its depth count is adjusted to reflect the same of amount of cable movement as the faster wheel.

BRIEF DESCRIPTION OF THE DRAWING

The FIGURE is a flow chart of the slippage correction method in accordance with the present invention.

DETAILED DESCRIPTION OF THE PREFERRED EMBODIMENT

In an exemplary system utilizing the present method, the depth pulses from both encoder wheels are detected by a micro-controller. The micro-controller accumulates these pulses and performs wheel correction by deleting or doubling pulses periodically according to the specified wheel correction. For example, if the wheel correction is 1 in 10,000, every 10,000th pulse is counted twice, or if the wheel correction is −2 in 10,000, every 5,000th pulse is not counted. Wheel corrections may cause the depth from a wheel to be either too high or too low at any instant, so wheels that correction. In a system such as described in U.S. Pat. No. 4,179,817, it has been found that either wheel can be either 0.1 inch too high or low, so that a 0.2-inch total difference between non-slipping wheels is possible. The difference between two agreeing wheels may be even larger because the wheels are not synchronized so that each 0.1 inch of movement will be detected from one wheel first and then from the other. Another 0.2 inch in error can be due to second-order effects like cable roll and angle of the tack from the winch. Therefore, two encoder wheels may disagree by up to 0.5 inch in depth even if there is no slippage on either. In accordance with the present invention, the micro-controller constantly monitors the counts from each encoder. If at some point it discovers that the depth from one encoder wheel differs by more than 0.5 inch from the measurement of the other, it corrects the slower one by setting its count to that of the faster one. The 0.5-inch limit used in the present embodiment of the present invention is exemplary, of course, and depends on the physical characteristics of the actual system.

Referring to the FIGURE, a method of computing the depth from two independent encoder wheels in accordance with the present invention will now be described. Pulses from encoder wheels 1 and 2 are detected at steps 10a and 10b, respectively. Whenever a pulse is detected from either wheel, a depth counter corresponding to that wheel is incremented (where incrementing is to be taken to mean the addition of either a positive or negative value depending upon the direction of rotation of the wheel) at either step 11a or 11b. Counter C1 keeps track of encoder wheel 1, while counter C2 keeps track of encoder wheel 2. The present values of each counter are compared at step 12. If the difference between the counters is greater than a specified limit value LV, which accounts for differences which may occur due to factors other than wheel slippage, such as wheel correction, it is assumed that wheel slippage has occurred. In a present embodiment of the present invention, the limit value LV is a pulse count corresponding to 0.5 inch. If the difference between the counters does not exceed the limit value LV, counting continues as before by returning to steps 10a and 10b. When the limit value is exceeded, whether depth is currently increasing or decreasing is determined at step 13. That is, it is determined whether the wireline is being pulled from or put into the bore hole. If depth is increasing and the depth measured by counter C1 exceeds that of counter C2 as determined at step 14b, then wheel 2 must have slipped. Therefore, at step 15b, counter C2 is set to the value of counter C1 and the ST2 value is incremented. ST2 is a pulse count corresponding to the total amount of slippage which has occurred for encoder wheel 2. Encoder wheel 2 is also determined to have slipped if the depth is currently decreasing as determined at step 13 and counter C2 exceeds counter C1, in which case step 15b is performed as before. On the other hand, if depth is decreasing and counter C1 exceeds counter C2, step 15a is performed. Step 15a is also performed if depth is increasing and counter C2 exceeds counter C1. At step 15a, it is determined that encoder wheel 1 has slipped and the value of counter C1 is set to that of counter C2. ST1, which is a pulse count corresponding to the total amount of slippage by wheel 1, is also incremented. At steps 16a and 16b, ST1 and ST2, respectively, are compared to a specified slip limit SL. If enough slippage has occurred that either ST1 or ST2 exceeds the slip limit SL, an alarm is activated at either step 17a or 17b. The method then continues in iterative fashion by returning to steps 10a and 10b.

What is claimed is:

1. A method for computing wireline depth measurements in a borehole using encoder wheels which frictionally engage the wireline so as to rotate in accordance with linear motion of the wireline and which also produce pulses in accordance therewith, comprising the steps of:

detecting pulses produced by the rotation of first and second encoder wheels whose rotation corresponds to linear motion of a wireline;

incrementing a first depth counter when a pulse is detected from the first encoder wheel and incrementing a second depth counter when a pulse is detected from the second encoder wheel;

comparing the depth count for each encoder wheel and determining whether a difference exists;

determining whether the wireline depth is increasing or decreasing; and if a difference between the depth counts for the first and second encoder wheels exists, setting the value of the lesser depth counter equal to that of the greater depth counter if the wireline depth is currently increasing and setting the value of the greater depth counter equal to the lesser depth counter if wireline depth is currently decreasing.

2. The method as set forth in claim 1 wherein the difference between the two depth counters must exceed a predetermined value before the value of one depth counter is set equal to that of the other depth counter.

3. The method as set forth in claim 2 additionally comprising the step of incrementing a slippage counter every time one depth counter is set equal to the value of the other depth counter and activating an alarm when the value of the slippage counter exceeds a predetermined value.

* * * * *